United States Patent [19]

Ligh

[11] Patent Number: 5,072,749

[45] Date of Patent: * Dec. 17, 1991

[54] DIFFERENTIAL PRESSURE REGULATOR

[76] Inventor: Jone Y. Ligh, P.O. Box 420509, Houston, Tex. 77242-0509

[ * ] Notice: The portion of the term of this patent subsequent to Nov. 26, 2005 has been disclaimed.

[21] Appl. No.: 646,212

[22] Filed: Jan. 28, 1991

Related U.S. Application Data

[63] Continuation-in-part of Ser. No. 630,570, Dec. 20, 1990, which is a continuation of Ser. No. 554,550, Jul. 19, 1990, Pat. No. 4,991,620, which is a continuation of Ser. No. 352,619, May 15, 1989, abandoned, which is a continuation of Ser. No. 213,928, May 15, 1989, abandoned.

[51] Int. Cl.$^5$ ............................................ G05D 16/06
[52] U.S. Cl. .............................. 137/116.5; 137/505.18; 137/505.14
[58] Field of Search ................... 137/116.5, 85, 505.14, 137/505.18; 251/282

[56] References Cited

U.S. PATENT DOCUMENTS

| | | | |
|---|---|---|---|
| 2,806,481 | 9/1957 | Faust | 137/116.5 |
| 3,491,785 | 1/1970 | Kay | 137/85 |
| 3,926,204 | 12/1975 | Earl | 137/116.5 |

FOREIGN PATENT DOCUMENTS 1445110  8/1976  United Kingdom ............ 137/116.5

Primary Examiner—Alan Cohan
Attorney, Agent, or Firm—Kenneth H. Johnson

[57] ABSTRACT

A differential pressure regulator is provided having a single piece pressure balanced flow spindle. The differential pressure regulator also includes a spring biased diaphragm assembly which acts against the pressure balanced flow spindle which is spring biased to the closed position. The upper surface of the diaphragm assembly is exposed to the signal pressure, and the lower surface of the diaphragm assembly is exposed to the outlet pressure. An adjustable spring is situated above the upper diaphragm to provide an additional or additive downward force on the upper diaphragm necessitating a greater force on the outlet side to close the valve. A vent is provided through the central bolt and spacer rings. The upper end of the flow spindle blocks the vent in the central bolt so long as the signal pressure plus the spring pressure is greater than or equal the outlet pressure.

10 Claims, 3 Drawing Sheets

DIFFERENTIAL PRESSURE REGULATOR

BACKGROUND OF THE INVENTION

This application is a continuation-in-part of my earlier filed patent application Ser. No. 07/630,570 filed on Dec. 20, 1990, which was a continuation of application Ser. No. 07/554,550 filed on 7/19/90 now U.S. Pat. No. 4,991,620 issued 2/12/91 which was a continuation of application Ser. No. 07/352,619 filed 5/15/89 now abandoned which was a continuation of application Ser. No. 07/213,928 filed 5/15/89 now abandoned.

FIELD OF THE INVENTION

The present invention relates to pressure regulators, and more particularly relates to regulators which maintain a fixed pressure difference between two separate areas. More particularly the invention relates to a differential pressure regulator which contains fewer parts and is simpler in construction that conventional differential pressure regulators. Most particularly, the invention relates to a differential pressure regulator for controlling a desired pressure difference under static conditions.

RELATED ART

Pressure regulators for maintaining a desired pressure under changing conditions of flow have been known in the art for many years. Additionally, spring biased additive pressure regulators are also old in the art. One example of a spring biased additive pressure regulator is a FAIRCHILD Model 15 or 15S positive biased relay. The theory of operation of such spring biased additive pressure regulators as embodied in the FAIRCHILD Model 15 or 15S is that an adjustable spring adds a force to the signal or sensing side of a diaphragm assembly. This necessitates that the supply pressure cause a force greater than the signal to close the regulator when the signal pressure increases. If the signal pressure decreases, less force from the supply source is needed to close the regulator. In flow conditions, the regulator may also be used to throttle the outlet fluid to maintain the desired downstream pressure. In static conditions the regulator will always be closed so long as the pressure difference is as desired —at the set point. Under such static conditions, the regulator will only open in response to an increase in the signal pressure and then close again when the set point is achieved. Additionally, there must be some means provided to vent the excess outlet pressure when the signal pressure decreases, especially in static pressure conditions.

In order to achieve the desired result, the moving trim or spindle within the regulator must be balanced in some fashion to prevent movement in response to changes in supply pressure only. In the FAIRCHILD positive biased relays referenced above a balance diaphragm is attached to the side of the trim opposite the seat to assure that the forces acting on the upper and lower ends of the trim due to the supply pressure are equal.

It is an advantage of the present invention that a differential pressure regulator is provided having a simplified construction which does not require the special balancing diaphragm of the prior art.

SUMMARY OF THE INVENTION

The present invention is a differential pressure regulator having a spring biased diaphragm assembly which acts against an oppositely spring biased flow spindle. The diaphragm assembly comprises two diaphragms separated by spacer rings and held together by a central bolt. The upper surface of the top diaphragm is exposed to the signal pressure, and the lower surface of the lower diaphragm is exposed to the outlet pressure. An adjustable spring is situated above the upper diaphragm to provide an additional or additive downward force on the upper diaphragm. A vent is provided through the central bolt and spacer rings. The upper end of the flow spindle blocks the vent in the central bolt so long as the signal pressure plus the spring pressure is greater than or equal to the outlet pressure.

The balancing of the flow spindle is achieved by a one piece spindle omitting a balance diaphragm and having seating surfaces that in the closed position are substantially equal to provide equalizing forces and an internal fluid passageway to allow the pressure above and below the spindle to equalize when it opens.

DESCRIPTION OF THE PREFERRED EMBODIMENT

For a detailed description of the preferred embodiment the reader is directed to the accompanying drawings in which like components are given like numerals for ease of reference.

Figure 1:
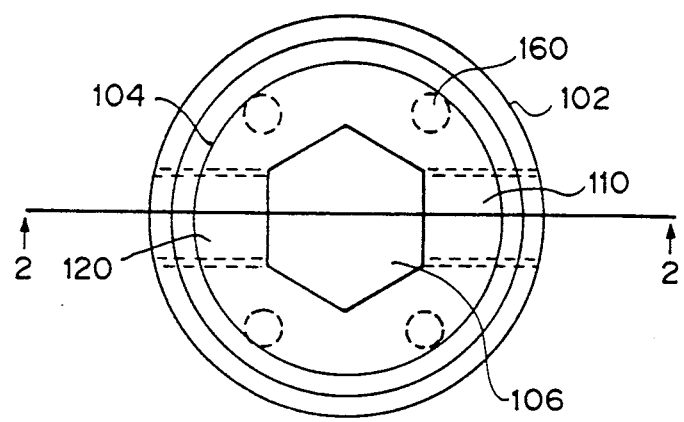
FIG. 1 is a top view of the preferred embodiment of the differential pressure regulator of the present invention.
Figure 2:
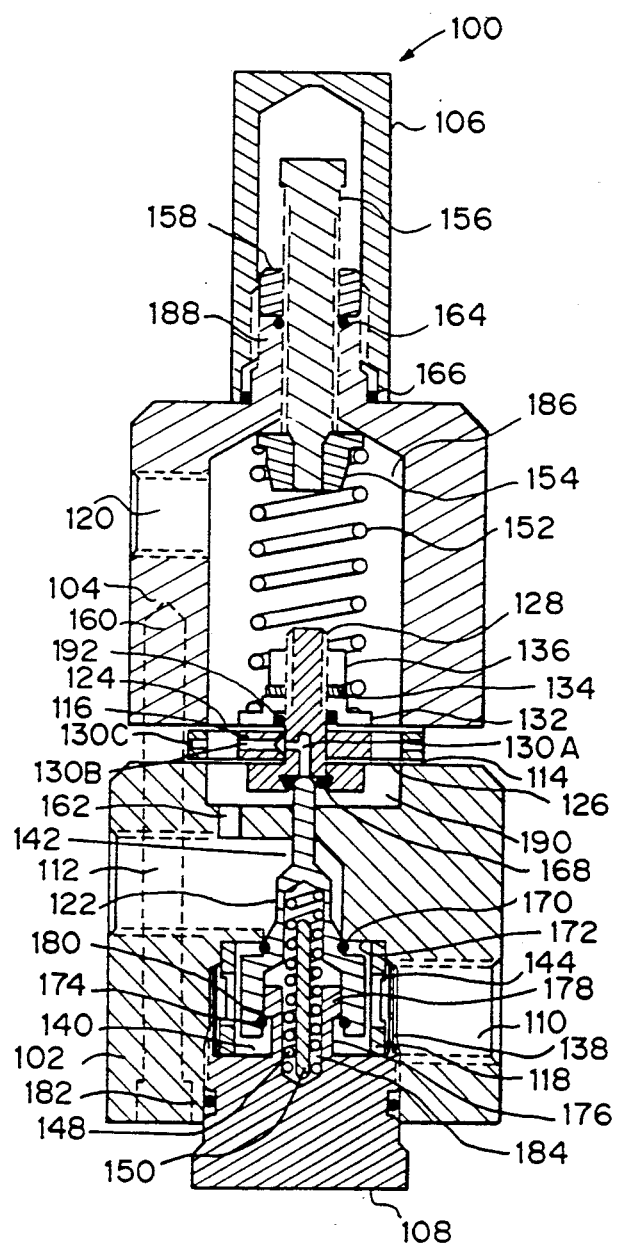
FIG. 2 is an elevational view in cross sectional view taken along line 2—2 of FIG. 1.
Figure 3:
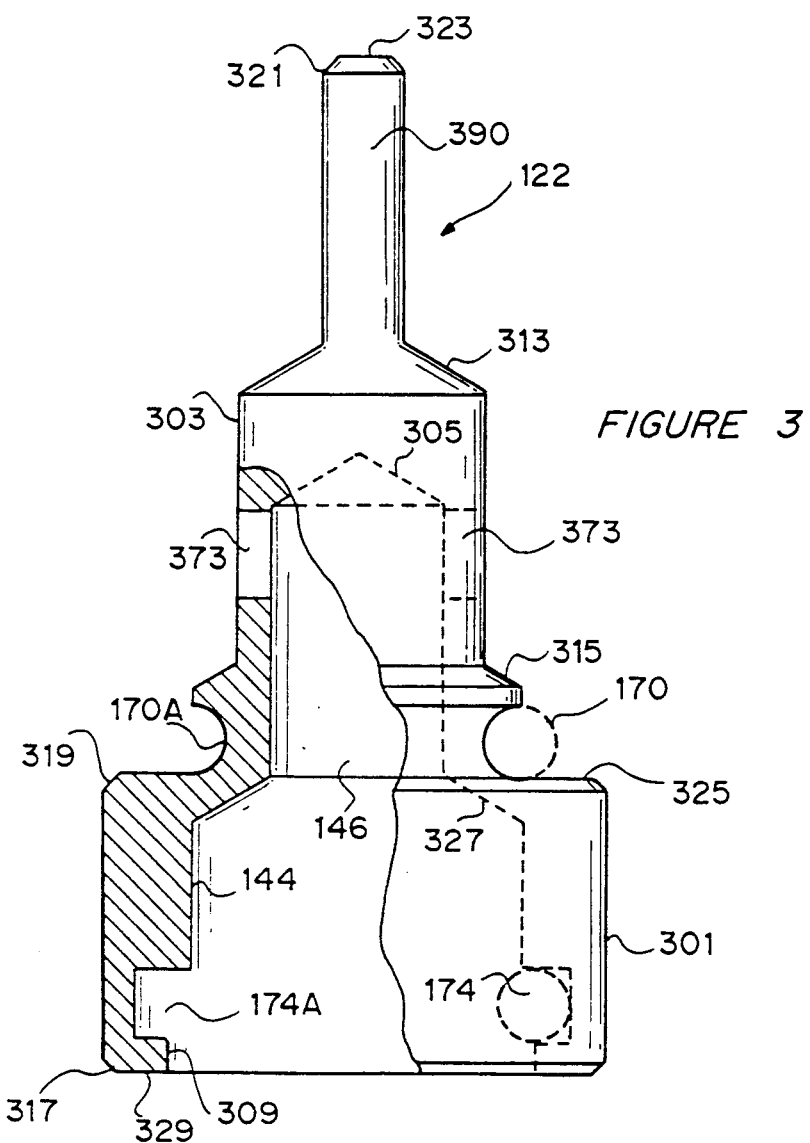
FIG. 3 is an elevational view in partial cross section of the special pressure balanced spindle used in the preferred embodiment of the differential pressure regulator of the present invention.
Figure 4:
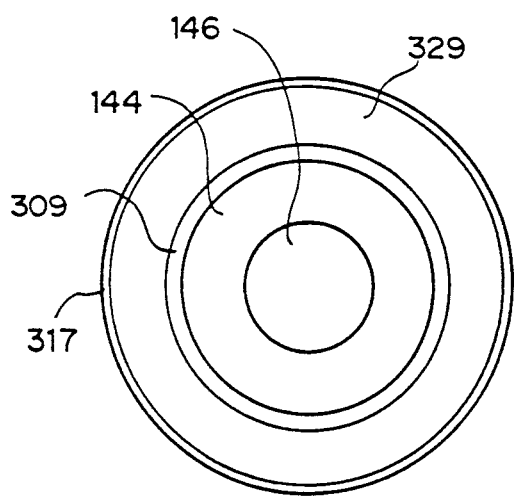
FIG. 4 is a bottom plan view of the special pressure balanced spindle used in the preferred embodiment of the differential pressure regulator of the present invention.
Figure 5:
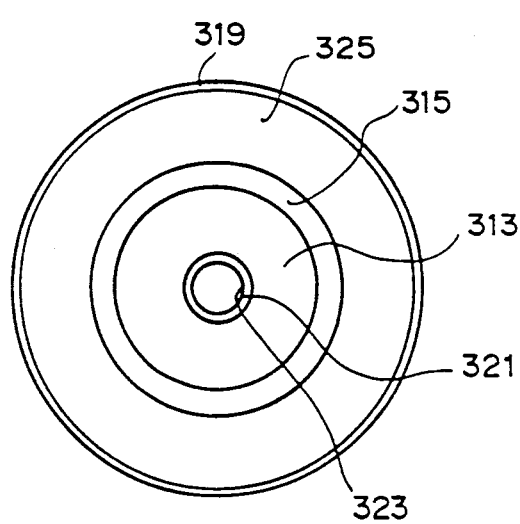
FIG. 5 is a top plan view of the special pressure balanced spindle used in the preferred embodiment of the differential pressure regulator of the present invention.

A detailed mechanical description is given in FIG. 2 which is an elevational view in cross section and FIG. 1 which is a top view. The differential pressure regulator, generally indicated at 100, is seen to comprise a cylindrical body 102 and a cylindrical spring bonnet 104 axially aligned and mounted on the body 102 with assembly screws 160 (only one shown) oriented as shown in FIG. 1. Between the body 102 and the spring bonnet 104 are located upper diaphragm 124 and lower diaphragm 126 which are separated by inner spacer ring 116 and outer spacer ring 114. Directly above and adjacent the upper diaphragm is lower bonnet spring guide 132. The two diaphragms 124 and 126 and the two spacer rings 114 and 116 are held together by central bolt 128, nut 136 and lock washer 134. For reasons to be discussed below, the central bolt and spacer rings are provided with bleed holes 130A, 130B and 130C respectively. The bleed hole 130A in the central bolt 128 begins at the bottom and continues at a right angle to provide a vent between the diaphragms 124 and 126.

Looking now at the body 102 of the regulator 100, at the lower end thereof there is seen to be a body plug 108 inserted as by threads through the bottom surface and sealed therein by O-ring seal 182. The body plug 108 is shown to include an extension 176 from the top surface having a T type head 178. Within the body 102 there is a coaxial cylindrical lower body cavity 140 and a coaxial upper body cavity 142 or dome of smaller diameter than the lower body cavity 140. Together the lower body cavity 140 and upper body cavity 142 make up the flow chamber within which is mounted the spindle 122 and body plug 108. Supply inlet 110 is provided normal to the lower body cavity 140 and outlet 112 is provided normal to upper body cavity or dome 142. Directly below the lower diaphragm 126 and formed in the upper end of body 102 is chamber 190 which is in fluid communication with outlet 112 via internal passageway 162. Strainer screen 138 is provided within the lower body cavity 140 so as to cover the inlet 110. Spacer ring 118 is located within the lower body cavity 140 to assure the correct distance between the upper surface of the body plug 108 and the surface 172 of the upper end of the lower body cavity 140.

The special pressure balanced spindle 122 is snugly mounted about the T type head 178 by lower spindle cavity 144 for rectilinear movement within the body cavities 140 and 142. Additionally, the spindle 122 includes an upper spindle cavity 146 which acts as the upper receptacle for spindle spring 148. The lower end of the spindle spring 148 is housed in body plug spring receptacle 184. Spindle spring guide pin 150 provides lateral stability for spindle spring 148. The spindle is provided with two seating surfaces within the lower body cavity 140. The upper seating surface comprises O-ring seal 170 which seats against the surface 172 between the two body cavities 140 and 142. The lower seating surface comprises a second O-ring seal 174 which seats against the underside of T type head 178. The spindle 122 is biased upward by the spindle spring 148 to engage the sealing surfaces and block the flow chamber. A more detailed description of the special spindle is contained below with reference to FIG.'s 3-5. The top end of spindle 122 is shown seated in and blocking the lower end of the center bolt bleed hole 130A with the aid of O-ring seal 168.

The spring bonnet 104 is shown to have coaxial bonnet cavity 186 to which the signal or bias pressure feed-back port 120 is connected at a right angle. Bonnet spring 152 is mounted within bonnet cavity 186 and held in place at the lower end by lower bonnet spring guide 132. The lower bonnet spring guide 132 is held in place by aforementioned central bolt 128, lock washer 134 and nut 136. Interposed between the lower surface of bonnet spring spacer 132 and upper diaphragm 124 and about bolt 128 is O-ring seal 192. At the upper end the bonnet spring 152 is retained by bonnet spring button 154 which is connected to adjusting screw 156 which is threadedly inserted through upper extension 188 of bonnet 104. The Adjusting screw 156 is provided with jam nut 158 for locking the adjusting screw 156 in the desired position. The jam nut 158 is provided with O-ring seal 164 preferably of TEFLON to prevent the escape of vapors entering the bonnet cavity 186 through the bias pressure feedback port 120. In the event that the sensed vapors entering the feed-back port 120 are dangerous additional sealing is provided by cap 106 which is threadedly connected about upper bonnet extension 188 and sealed thereon by O-ring seal 166.

Referring now to FIG.'s 3-5 more detail of the pressure balanced spindle is shown. The O-ring seals 170 and 174 are shown in dotted lines as they appear in the earlier FIG.'s. The pressure balanced spindle, generally indicated at 122, is shown to comprise three axially aligned cylindrical segments of decreasing diameter.

The first and largest diameter segment comprises the base 301 within which is the lower spindle cavity 144 which acts as the lower sealing and spindle guide chamber. Internal annular groove 174A is provided to receive the O-ring 174 which makes up the lower seal. Bore 309 is of slightly larger diameter than lower spindle cavity 144 to allow expansion of the O-ring 174 as it seats.

The second segment 303 contains the upper spindle cavity 146 which acts as the spindle return spring receptacle chamber and the important pressure balancing ports 373 which comprise a bore normal to and through the second segment 303 and the upper spindle cavity 146. Between the first and second segments there is provided an external annular groove 170A to receive and hold the O-ring 170 which makes up the upper seal.

The third and smallest diameter segment is the actuator stem 390 which is in contact with the lower surface of central bolt 128 for moving the spindle up and down within the valve body. Surfaces 317, 319 and 321 are machine dressing. Surfaces 313 and 315 are tapered to provide strength between segments. Additionally, surface angle 313 matches the surface angle within the upper body cavity 142 which is the result of the boring process. Surfaces 327 and 30 are simply the result of the boring process to produce the lower spindle cavity 144 and the return spring receptacle 146.

The two important features of the pressure balanced spindle are: 1) that the seating surfaces in the closed position be substantially equal to provide equalizing forces; and 2) that there is an internal fluid passageway to allow the pressure above and below the spindle to equalize when it opens. The upper pressure responsive surface when closed comprises the exposed surface of O-ring 170 and the exposed upper surface 325 of base 301. The lower pressure responsive surface when closed comprises the exposed surface of O-ring 174 and lower surface 329 of base 301. The internal fluid passageway is made up of bore 309, lower spindle cavity 144, upper spindle cavity 146 and ports 373.

Figure 6:
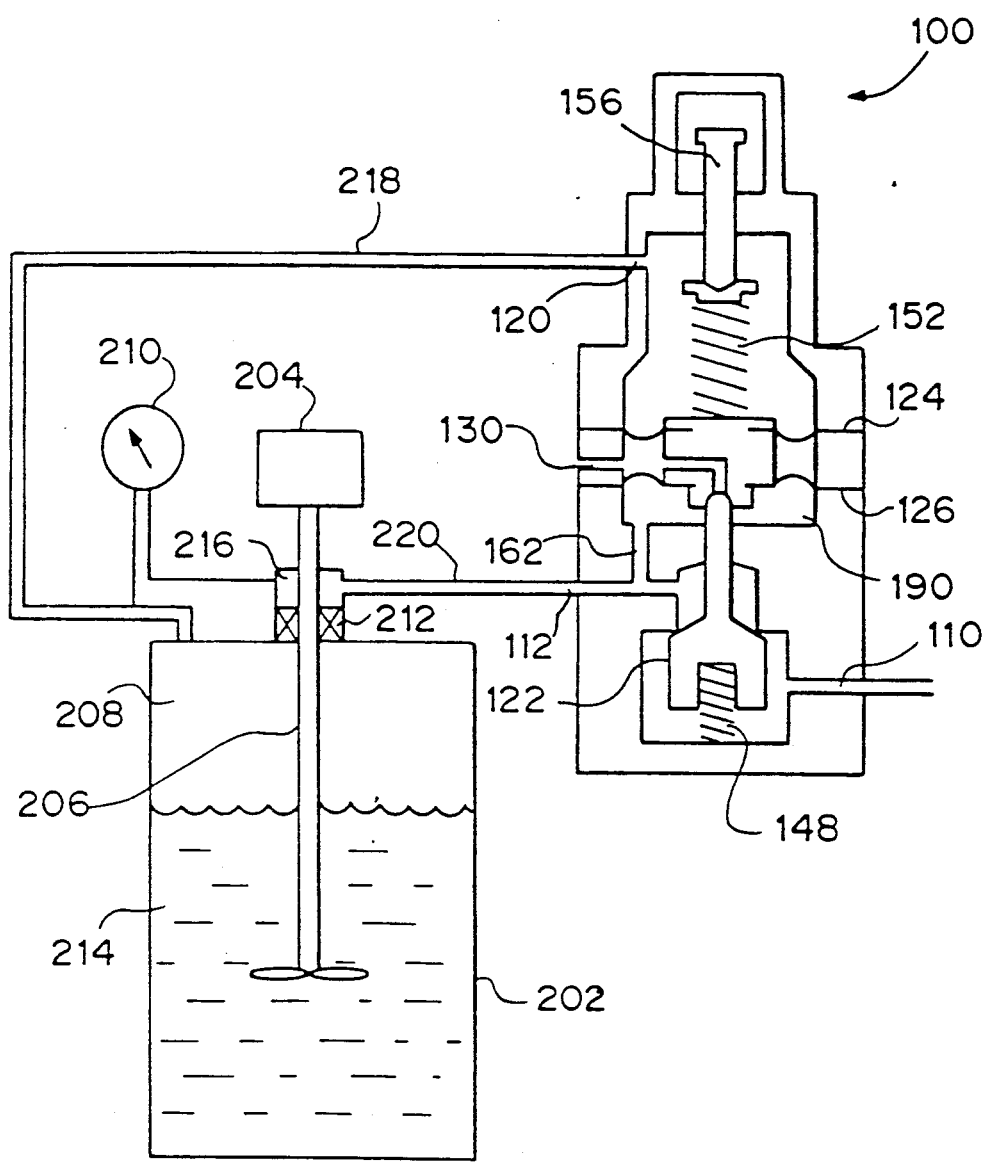
FIG. 6 is a schematic diagram of one use of the differential pressure regulator of the present invention.

Referring now to FIG. 6 there is shown in schematic form one use of the differential pressure regulator of the present invention. The particular use shown is to maintain the differential pressure across a packing gland 212 around a rotating shaft to prevent leakage and prolong the life of the gland.

In the embodiment shown in FIG. 6 there is shown a closed stirred tank 202 containing a liquid 214 and having a vapor space 208 above the liquid level. The liquid 214 within the tank 202 is stirred by agitator 204 having a rotating shaft 206 which passes through packing gland 212 at the top of the tank 202. A differential pressure gauge 210 is connected between the vapor space 208 and the outer packing volume 216.

The vapor space 208 is in fluid communication with the bias pressure feed-back port 120 via line 218. The outer volume 216 of the packing gland 212 is in fluid communication with the regulator outlet 112 via line 220. In the following example a differential pressure of 10 pounds per square inch (psi) is desired across the packing gland 212, i.e, the pressure in outer packing gland volume 216 is desired to be 10 psi higher than the pressure in the vapor space 208.

In operation the differential pressure regulator is first set to a 10 pounds per square gauge (psig) output via the adjusting screw 156 without any feed-back pressure by temporarily disconnecting the feed-back line 218. The differential pressure gauge 210 may be used to set the regulator by disconnecting the gauge from the feed-back line. At this point, after the lines have been reconnected, the regulator will apply 10 psig on top of the packing when the pressure in the vapor space is atmospheric or zero gauge.

When the vapor space pressure rises above zero it adds to the set pressure spring force, pound for pound, and increases the output pressure of the regulator to 10 psig plus the vapor space pressure, therefore maintaining a differential pressure of 10 psi across the packing. When the vapor space pressure goes to vacuum, an upward force is exerted on the upper diaphragm 124 (the two diaphragms being connected by the central bolt 128) and the downward force of the spring is decreased pound for pound. The regulator output pressure is then 10 psig minus the vapor space pressure, still maintaining a 10 psi differential pressure across the packing. In the embodiment shown here the ratio of diaphragm areas is the same so that the outlet pressure is 1:1 to the change in vapor space pressure. By adjusting the diaphragm ratios the output pressure is similarly adjusted, e.g. by reducing the area of lower diaphragm 126 to one-half that of upper diaphragm 124 the output pressure is twice the signal pressure plus the spring force.

Because the output of the regulator is in a dead ended service, provision must be made to bleed off excess pressure on the packing whenever it occurs. Such excess pressure on the packing tends to occur whenever the vapor space pressure is decreasing. When this happens, the diaphragm assembly is lifted upward off of the upper tip of the spindle 122 due to the higher force under the lower diaphragm 126 than the combined spring and vapor space pressure force on top of the upper diaphragm 124. The tip of the spindle 122 is thus unseated from the lower opening of the central bolt vent hole 130A allowing the excess pressure on the packing to escape to the atmosphere through the vent 130 which comprises vent holes 130A and the vent holes 130B and 130C in the inner and outer spacer rings respectively. The bleed port will close when the upward and downward forces across the diaphragms are in balance again.

The design allows only small amounts of the blanketing gas, such as nitrogen, to escape into the atmosphere, and this happens only when the vapor space pressure decreases. The differential pressure regulator of the present invention is not a constant bleed device. The vapor space pressure is retained in the system and is not discharged to the atmosphere. This latter is a safety feature in case the vapor is toxic.

The invention claimed is:

1. A differential pressure regulator comprising:
   (a) a valve body having inlet and outlet ports in fluid communication with each other through a flow chamber;
   (b) a pressure balanced spindle of single piece construction slidably mounted within said flow chamber and biased to seat within said flow chamber to block fluid communication therethrough, said pressure balanced valve spindle comprising three axially aligned and connected cylindrical segments of decreasing diameter, the first and largest diameter segment defining a lower seating and guide chamber therein and having an internal annular groove to receive a first O-ring seal, the second segment defining a spring receptacle chamber therein and having a bore normal to and through said second segment and said spring receptacle chamber, the third and smallest diameter segment defining an actuator stem which is in contact with a diaphragm assembly, and an external annular groove between said first and second segments to receive a second O-ring seal;
   (c) said diaphragm assembly mounted on said body and in contact with said spindle to press on and unseat said spindle in response to forces acting on said diaphragm assembly, said diaphragm assembly being in fluid communication with said outlet port;
   (d) a spring bonnet mounted on said body above said diaphragm assembly having a bias pressure feed-back port in fluid communication with said diaphragm assembly and containing an adjustable biasing spring in contact with said diaphragm assembly to provide a force additive to that provided by pressure entering said bias pressure feed-back port; and
   (e) vent means through said diaphragm assembly which acts in response to fluid vapor pressure from said outlet port which is higher than the force of said adjustable biasing spring and pressure entering said bias pressure feed-back port.

2. The differential pressure regulator of claim 1 wherein said diaphragm assembly comprises an upper diaphragm and a lower diaphragm connected together by a central bolt and separated by inner and outer spacer rings, and said vent means comprises an aperture through said central bolt and vent holes through said inner and outer spacer rings, said actuator stem blocking said aperture when the force of said adjustable spring and pressure entering said bias pressure feed-back port is equal to or higher than the force on said diaphragm from the fluid vapor pressure from said outlet port.

3. The differential pressure regulator of claim 1 further comprising a body plug having a T type projection extending into said flow chamber, and said T type projection provides a lower seating surface for said pressure balanced spindle.

4. The differential pressure regulator of claim 1 wherein said pressure balanced spindle further comprises first and second O-ring seals disposed in said internal and external annular grooves, respectively, exposing a portion of each of said O-ring seals.

5. The differential pressure regulator of claim 4 wherein the lower surface area of said base plus the exposed surface area of said first O-ring seal is substantially equal to the upper surface area of said base not covered by said second O-ring seal plus the exposed surface area of said second O-ring seal.

6. The differential pressure regulator of claim 1 wherein the diameter of said lower seating and guide chamber below said internal annular groove is wider than the diameter of said lower seating and guide chamber above said internal annular groove.

7. The differential pressure regulator of claim 1 wherein said pressure balanced valve spindle omits a balance diaphragm.

8. A differential pressure regulator comprising:

(a) a valve body having inlet and outlet ports in fluid communication with each other through a flow chamber;

(b) A pressure balanced valve spindle of single piece construction slidably mounted within said flow chamber and biased to seat within said flow chamber to block fluid communication therethrough and comprising three axially aligned and connected cylindrical segments of decreasing diameter, the first and largest diameter segment defining a lower seating and guide chamber therein and having an internal annular groove to receive a first O-ring seal, the second segment defining a spring receptacle chamber therein and having a bore normal to and through said second segment and said spring receptacle chamber, the third and smallest diameter segment defining an actuator stem, and an external annular groove between said first and second segments to receive a second O-ring seal;

(c) a diaphragm assembly mounted on said body and in contact with said spindle to press on and unseat said spindle in response to forces acting on said diaphragm assembly, said diaphragm assembly being in fluid communication with said outlet port and comprising an upper diaphragm and a lower diaphragm connected together by a central bolt and separated by inner and outer spacer rings.

(d) a spring bonnet mounted on said body above said diaphragm assembly having a bias pressure feedback port in fluid communication with said diaphragm assembly and containing an adjustable biasing spring in contact with said diaphragm assembly to provide a force additive to that provided by pressure entering said bias pressure feed-back port; and (e) vent means comprising an aperture through said central bolt and vent holes through said inner and outer spacer rings, said actuator stem blocking said aperture when the force of said adjustable spring and pressure entering said bias pressure feedback port is equal to or higher than the force on said diaphragm from the fluid vapor pressure from said outlet port.

9. A differential pressure regulator comprising:
(a) a valve body having inlet and outlet ports in fluid communication with each other through a flow chamber;
(b) a pressure balanced valve spindle of single piece construction slidably mounted within said flow chamber and biased to seat within said flow chamber to block fluid communication therethrough comprising:
 (i) a cylindrical base defining a lower seating and guide chamber therein and having an internal annular groove within said lower seating and guide chamber;
 (ii) a first cylindrical projection extending from the upper surface of said base, said first cylindrical projection being of smaller diameter than and in axial alignment with said base and defining a spring receptacle chamber therein, said spring receptacle chamber being in fluid communication with said lower seating and guide chamber;
 (iii) an actuator stem projecting from the upper surface of said first cylindrical projection, said actuator stem being cylindrical and of smaller diameter than said first cylindrical projection;
 (iv) an external groove on said first cylindrical projection directly adjacent the upper surface of said base; and
 (v) a bore through said first cylindrical projection and said spring receptacle chamber;
(c) a diaphragm assembly mounted on said body and in contact with said spindle to press on and unseat said spindle in response to forces acting on said diaphragm assembly, said diaphragm assembly being in fluid communication with said outlet port;
(d) a spring bonnet mounted on said body above said diaphragm assembly having a bias pressure feedback port in fluid communication with said diaphragm assembly and containing an adjustable biasing spring in contact with said diaphragm assembly to provide a force additive to that provided by pressure entering said bias pressure feed-back port; and
(e) vent means through said diaphragm assembly which acts in response to fluid vapor pressure from said outlet port which is higher than the force of said adjustable biasing spring and pressure entering said bias pressure feed-back port.

10. A differential pressure regulator comprising:
(a) a valve body having inlet and outlet ports in fluid communication with each other through a flow chamber;
(b) a pressure balanced valve spindle of single piece construction slidably mounted within said flow chamber and biased to seat within said flow chamber to block fluid communication therethrough comprising:
 (i) a cylindrical base defining a lower seating and guide chamber therein and having an internal annular groove within said lower seating and guide chamber, the diameter of said lower seating and guide chamber below said internal annular groove is wider than the diameter of said lower seating and guide chamber above said internal annular groove;
 (ii) a first cylindrical projection extending from the upper surface of said base, said first cylindrical projection being of smaller diameter than and in axial alignment with said base and defining a spring receptacle chamber therein, said spring receptacle chamber being in fluid communication with said lower seating and guide chamber;
 (iii) an actuator stem projecting from the upper surface of said first cylindrical projection, said actuator stem being cylindrical and of smaller diameter than said first cylindrical projection;
 (iv) an external groove on said first cylindrical projection directly adjacent the upper surface of said base;
 (v) first and second O-ring seals disposed in said internal and external annular grooves, respectively, exposing a portion of each of said O-ring seals and
 (vi) a bore through said first cylindrical projection and said spring receptacle chamber; wherein the lower surface area of said base plus the exposed surface area of said first O-ring seal is substantially equal to the upper surface area of said base not covered by said second O-ring seal plus the exposed surface area of said second O-ring seal;
(c) a diaphragm assembly mounted on said body and in contact with said spindle to press on and unseat said spindle in response to forces acting on said diaphragm assembly, said diaphragm assembly being in fluid communication with said outlet port;

(d) a spring bonnet mounted on said body above said diaphragm assembly having a bias pressure feed-back port in fluid communication with said diaphragm assembly and containing an adjustable biasing spring in contact with said diaphragm assembly to provide a force additive to that provided by pressure entering said bias pressure feed-back port; and (e) vent means through said diaphragm assembly which acts in response to fluid vapor pressure from said outlet port which is higher than the force of said adjustable biasing spring and pressure entering said bias pressure feed-back port.

* * * * *

UNITED STATES PATENT OFFICE
CERTIFICATE OF CORRECTION

PATENT NO. : 5,072,749
DATED : 12/17/91
INVENTOR(S) : Jone Y. Ligh

It is certified that error appears in the above-identified patent and that said Letters Patent is hereby corrected as shown below:

Title page
The disclaimer under * Notice should read:

"The portion of the term of this patent subsequent to Nov. 26, 2008 has been disclaimed."

Signed and Sealed this

Twentieth Day of April, 1993

Attest:

MICHAEL K. KIRK

*Attesting Officer*      Acting Commissioner of Patents and Trademarks